United States Patent [19]
Loomer et al.

[11] 3,844,423
[45] Oct. 29, 1974

[54] PALLET ACCUMULATOR
[75] Inventors: Weston R. Loomer; Thomas Fred Thornton, both of Rochester, N.Y.
[73] Assignee: Hartman Metal Fabricators Inc., Victor, N.Y.
[22] Filed: Dec. 8, 1972
[21] Appl. No.: 313,423

[52] U.S. Cl. ............................................. 214/6 BA
[51] Int. Cl. ............................................ B65g 57/30
[58] Field of Search................................ 214/6 BA

[56] References Cited
UNITED STATES PATENTS

| | | | |
|---|---|---|---|
| 2,792,950 | 5/1957 | Fenton et al. | 214/6 BA |
| 3,039,625 | 6/1962 | Bruce | 214/6 BA |
| 3,053,402 | 9/1962 | Russell et al. | 214/6 BA |
| 3,086,665 | 4/1963 | Schmip | 214/6 BA |
| 3,126,104 | 3/1964 | Haselton et al. | 214/6 BA |
| 3,235,100 | 2/1966 | Raynor | 214/6 BA |
| 3,310,183 | 3/1967 | Paquette | 214/6 BA |
| 3,325,021 | 6/1967 | Burns et al. | 214/6 BA |
| 3,490,610 | 1/1970 | Czarnecki et al. | 214/6 BA |
| 3,645,409 | 2/1972 | Sinclair | 214/6 BA |

*Primary Examiner*—Robert J. Spar
*Assistant Examiner*—Leslie J. Paperner
*Attorney, Agent, or Firm*—Shlesinger, Fitzsimmons & Shlesinger

[57] ABSTRACT

The accumulator has two opposed movable pallet supports positioned above two opposed stationary supports, and a reciprocable transfer member for shifting empty pallets upwardly one by one from the stationary supports onto the movable supports where they are stacked one above the other. During its upward movement each pallet swings the upper, movable supports out of the way until the pallet has passed slightly above these upper supports, which then swing back beneath the pallet to support it, and any others stacked thereon. When a predetermined number of empty pallets has been stacked in the accumulator a sensing device signals the stacker to remove the stacked pallets from the accumulator.

5 Claims, 5 Drawing Figures

PALLET ACCUMULATOR

This invention relates to automatic warehousing systems, and more particularly to a device for accumulating and temporarily storing empty pallets of the type employed in such systems.

In modern warehousing systems it is conventional to employ automatic load carriers, or stackers, that deliver loads into, and retrieve loads from, the bins of storage racks. Typically a stacker travels in an aisle between a pair of confronting storage racks, and is programmable to transfer loads automatically between the bins in the racks and a loading-unloading station located, for example, at one end of the aisle.

Additional access aisles may be located behind each storage rack so that operators can manually remove some or all of the load stacked on a pallet in a rack. For example, where small items are stacked on a pallet stored in a bin in a rack, demand for less than all of the items stacked on the pallet may warrant manual removal of a few items at a time from the pallet. Sooner or later, then, one or more of the pallets stored in a rack may be completely cleared of its load. To operate a warehousing system at maximum efficiency, it has been found most desirable to remove such empty pallets from the storage racks to make way for incoming, loaded pallets.

It is an object of this invention, therefore, to provide an improved system for removing empty pallets from storage racks, and for temporarily storing these pallets. To this end it is an object also of this invention to provide a pallet accumulator, which is adapted to be employed in conjunction with an automatic stacker of the type described to accumulate empty pallets that are retrieved from the system's storage racks.

A further object of this invention is to provide a pallet accumulator which automatically signals the associated stacker to remove the accumulated pallets when the exceed a predetermined number.

A further object of this invention is to provide a device which accumulates a predetermined number of empty pallets adjacent one end of a storage rack before automatically causing associated stacker to remove the accumulated pallets for delivery to another part of a warehousing system.

A further object of this invention is to provide a pallet accumulator having safety devices for preventing overload of the accumulator, or damage to the associated stacker.

Other objects of the invention will be apparent hereinafter from the specification and from the recital of the appended claims, particularly when read in conjunction with the accompanying drawings.

Figure 1:
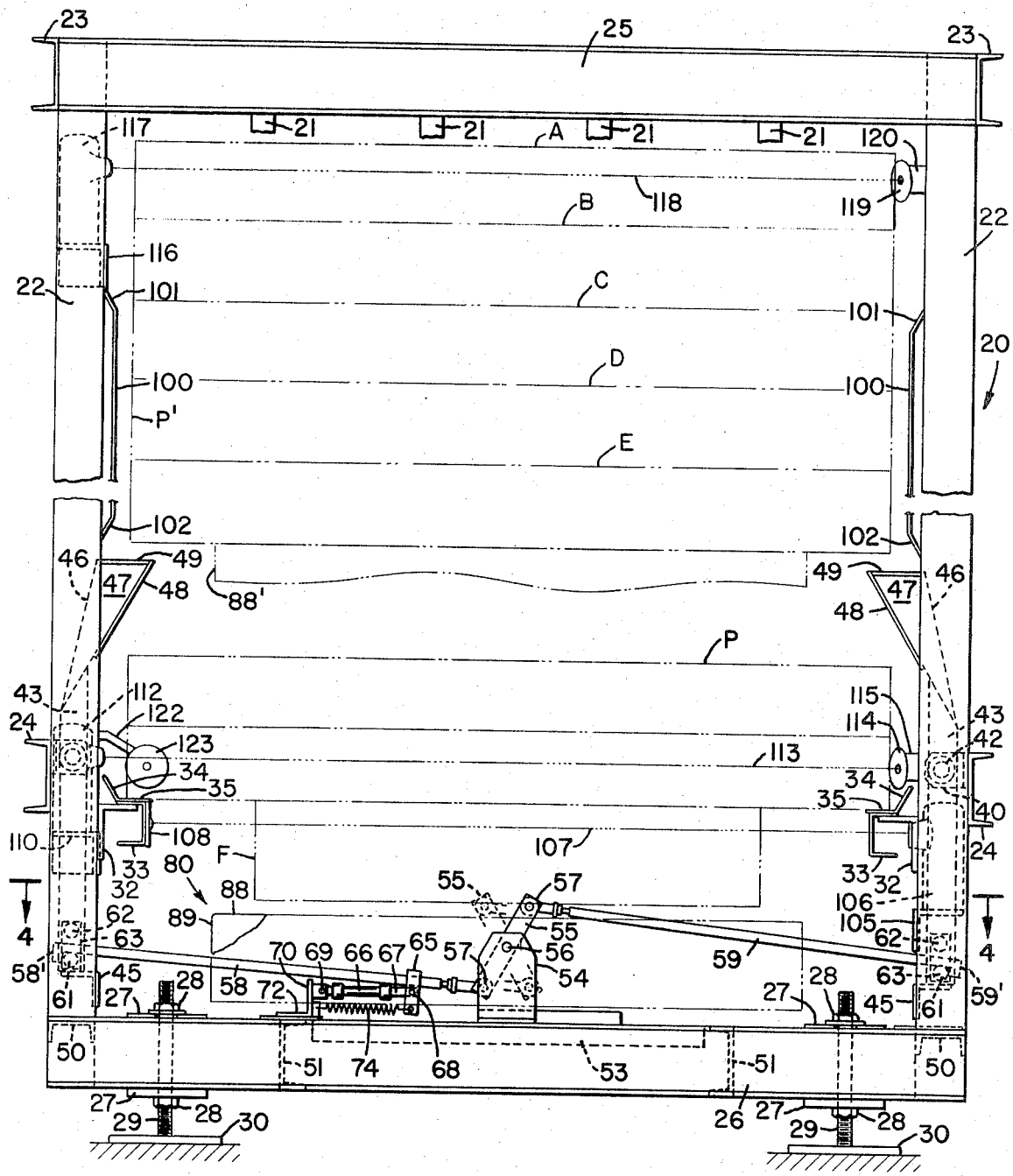
FIG. 1 is a fragmentary front elevational view of a pallet accumulator or storage device made in accordance with one embodiment of this invention, the pallet transfer mechanism being shown in phantom.

Referring now to the drawings by numerals of reference, 20 denotes generally a pallet accumulator comprising four uprights 22 that are arranged at the four corners of the accumulator frame and held in spaced, parallel relation by upper and lower beams 23, 24, 25, 26. The back of the device is closed by a plurality of spaced, parallel vertical bars 21 which are fastened between the rear beams 25 and 26. As shown more clearly in FIGS. 1 and 2, beams 26 are secured in back to back pairs to the lower ends of frame members 22 at the front and rear, respectively, of the device; and each pair of beams 26 is supported by bearing plates 27 and nuts 28 for vertical adjustment on spaced anchor posts 29 which project upwardly from stationary anchor plates 30 adjacent each corner of the device.

Fastened by angle brackets 32 to the insides of uprights 22 to extend horizontally along opposite sides of the device adjacent the side beams 24 are two channel irons 33. Secured on these channels to extend longitudinally thereof are two, elongate angle irons 34, which form pallet-supporting shelves 35 at opposite sides of the device.

Figure 2:
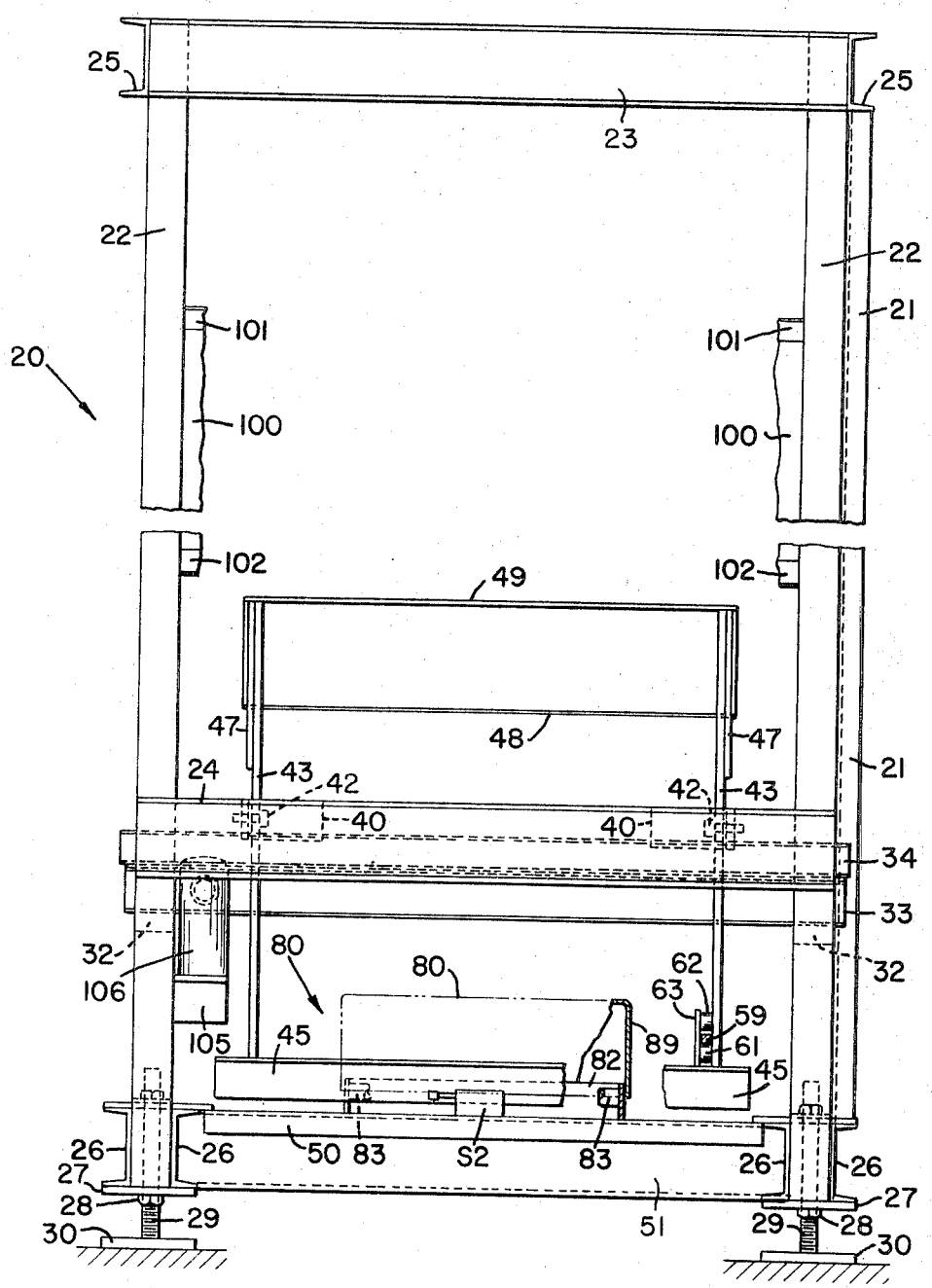
FIG. 2 is a side elevational view of this device looking toward the right side thereof as viewed in FIG. 1.
Figure 3:
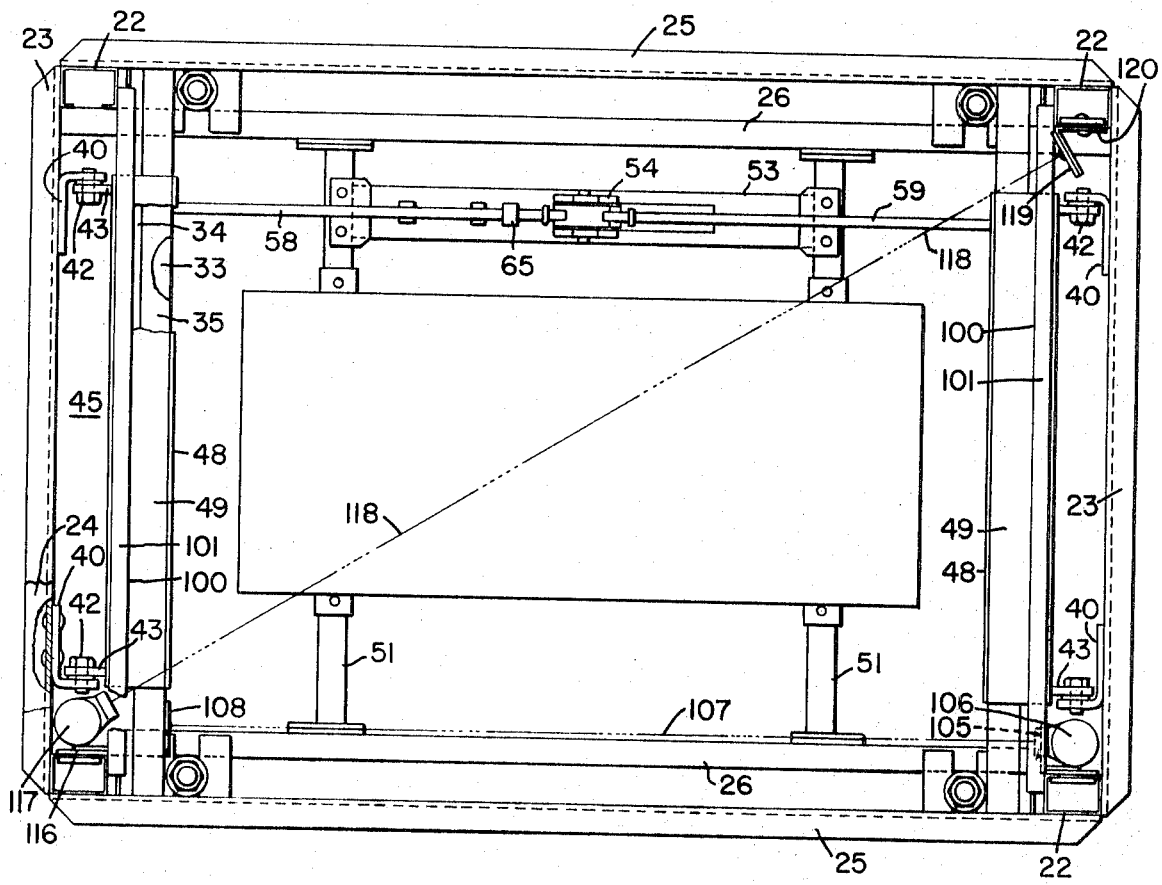
FIG. 3 is a plan view of this device.

Fastened to the inside of each beam 24 are two, spaced, right-angular brackets 40. A pair of spaced parallel legs 43 are pivotally connected intermediate their ends by bolts 42 (FIG. 3) to the brackets 40 at each side of the device. The two legs 43 of each pair are fastened at their lower ends to opposite ends of an elongate angle iron 45 (FIG. 2) The upper ends of each pair of legs 43 are bent steeply inwardly adjacent their upper ends as at 46 (FIG. 1), and are fastened by triangularly shaped gussets 47 to opposite ends of a rigid angle plate or escapement 48 (FIGS. 1 and 2). The legs 43 normally are maintained in the positions illustrated in FIGS. 1 and 2, where angle irons 45 trip switches S1 and S2 (FIGS. 2 and 4) that are fastened on beams 50 that extend along opposite sides of device 20 adjacent its lower end. At this time the undersurfaces of the two escapements 48 overlie the stationary shelves 35; and the two pallet supporting portions 49 of the plates at opposite sides of the device lie in a common horizontal plane.

Figure 4:
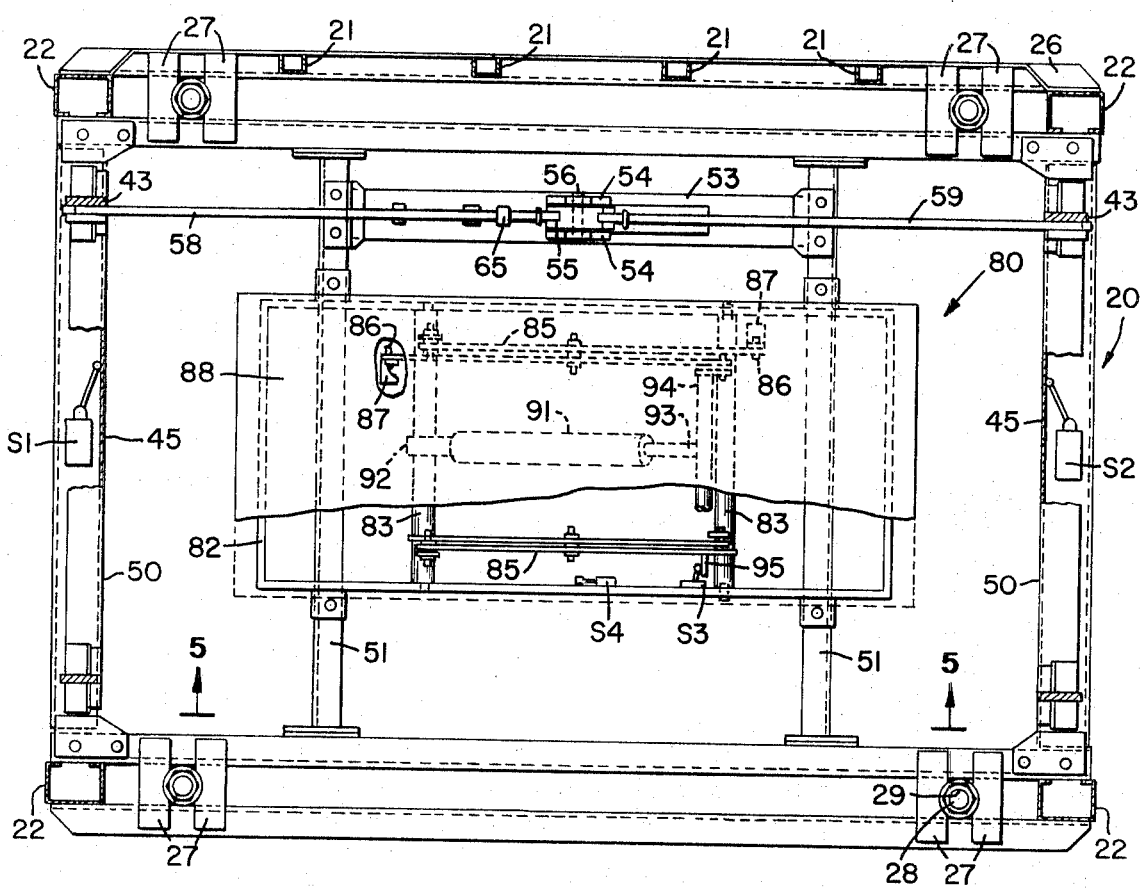
FIG. 4 is a horizontal sectional view of this device taken along the line 4—4 in FIG. 1 looking in the direction of the arrows.
Figure 5:
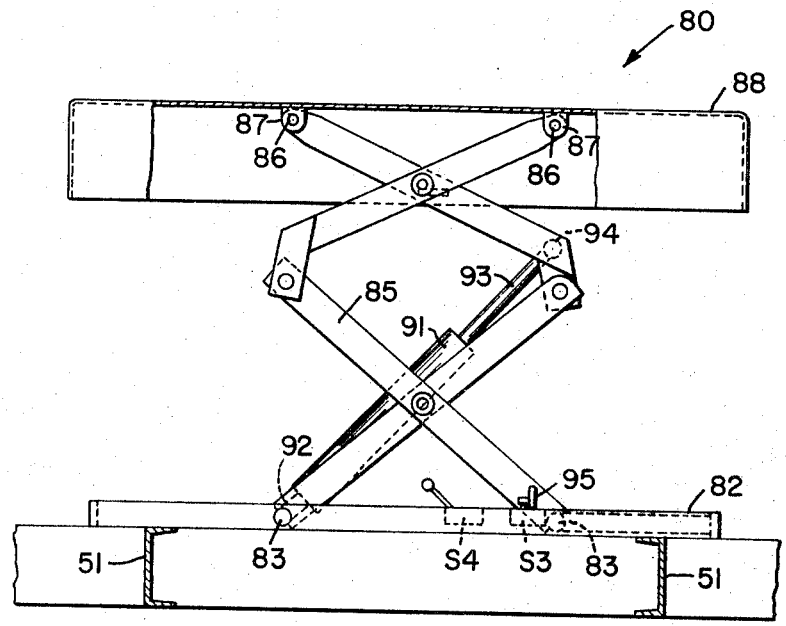
FIG. 5 is a fragmentary sectional view taken along the line 5—5 in FIG. 4, but illustrating the pallet transfer mechanism in its elevated position.

Secured to and extending parallel to one another between the two inside beams 26 are two lift supporting beams 51 (FIGS. 1, 4 and 5). Projecting upwardly from a channel member 53 that extends transversely between the confronting surface of beams 51 are the two legs 54 (FIGS. 1 and 4) of a U-shaped bracket. A lever 55 which is mounted intermediate its ends by a pin 56 to pivot between the legs 54 of this bracket, has its opposite ends pivotally connected by pins 57 (FIG. 1) to one end of each of two operating rods 58 and 59, respectively. The opposite end of rod 59 projects slidably between a pair of spaced rollers 61 and 62, which are mounted (FIGS. 1 and 2) between a bracket 63 and one of the escapement legs 43 at the right side of the device (FIG. 1). As shown more clearly in FIG. 1, a tab 59' on the outer end of rod 59 passes downwardly behind this roller 61 for a purpose to be described hereinafter.

Similarly, the end of rod 58 remote from lever 55 passes slidably between a pair of rollers 61 and 62 mounted between another bracket 63 and an escapement leg 43 at the opposite or left hand side of the device (FIG. 1). Also, as in the case of the rod 59, a tab 58' on the outer end of rod 58 passes behind the associated roller 61.

Fastened to rod 58 adjacent its inner end, and projecting downwardly beneath the rod is a strap 65 (FIGS. 1 and 4). A hydraulic cylinder 66 has a reciprocable piston rod 67 pivotally connected at one end by a pin 68 to the strap 65. At its opposite end cylinder 66 is pivotally connected by a pin 69 to a bracket 70, which is fixed to an angle plate 72 that is secured to the upper surface of the adjacent beam 51. A tension spring 74, which is fastened at one end to strap 65 and at its opposite end to the angle plate 72, operates to maintain lever 55 and the rods 58 and 59 resiliently in the positions shown in FIG. 1.

Numeral 80 (FIGS. 2 and 5) denotes generally a pallet lifting table, which is mounted for vertical movement above a rectangular frame 82 that is secured adjacent its opposite ends on the horizontal beams 51 forwardly (FIG. 4) of the operating rods 58 and 59. Rotatably mounted between opposite longitudinal sides of frame 82 are two parallel shafts 83, to which are fixed the lower ends of two lazy tong mechanisms 85. The upper ends of the two tong mechanisms are pivotally connected by pins 86 (FIG. 4) to legs 87, which are fastened to the underside the pallet-supporting table or 88. When table 88 is in its lowermost position (FIGS. 1 and 2), the retracted tong mechanisms 85 are hidden by he skirt 89 of the table.

The table 88 is raised and lowered by a hydraulically operated mechanism comprising a cylinder 91 (FIGS. 4 and 5), which is attached at one end as at 92 to one of the shafts 83, and a piston rod 93, which is reciprocable in this cylinder and is secured to a bar 94, which is fastened at opposite ends to parallel links of the two lazy-tong mechanisms 85, so that upon extension or retraction of rod 93, the linkages 85 will likewise be extended or retracted, thereby raising or lowering, respectively, table 88. As pointed out hereinafter, this motion is controlled, at least in part, by two switches S3 and S4 (FIGS. 4 and 5), which are mounted on the frame 82 for operation, respectively, by a dog or projection 95 on the adjacent linkage 85, and by table 88. When table 88 is in its lower or inoperative position, switch S4 is tripped; and when the table 88 is elevated to its uppermost position (FIG. 5), switch S3 is tripped by dog 95.

Mounted on uprights 22 at opposite sides of the device above the plates 48 (FIG. 1) are two, spaced, parallel guide plates 100. The upper and lower edges of plates 100 are inclined as at 101 and 102, respectively, (FIG. 1) to prevent damage to pallets, or to the loads thereon, when the latter are shifted vertically as described hereinafter.

Secured adjacent its lower end to a bracket 105 (FIG. 1), which is fastened to the inside of one of the uprights 22 is a photoswitch unit 106. This unit contains a light source, which projects a beam of light horizontally through registering openings (not illustrated) in adjacent members 32 and 33, and along the line 107 (FIG. 1) onto a disc-shaped plastic reflector 108, which is fastened on the opposed channel 33.

Secured to a bracket 110 (FIG. 1), which is fastened to the forward upright 22 at the left hand side of the device is another photoswitch unit 112. Unit 112 is positioned slightly above unit 106, and directs a beam of light diagonally across the interior of the device along the axis 113 onto a reflective disc 114, which is secured by a bracket 115 to the inside of the upright 22 located at the right rear corner of the device.

Mounted above unit 112 on a bracket 116 (FIGS. 1 and 3) that is fastened to near the top of the same upright 22 as bracket 110 is a further photoswitch unit 117. This unit 117 directs a beam of light horizontally and diagonally along an axis 118 (FIG. 3) across the device onto a disc-shaped reflector 119 that is mounted by a bracket 120 on the same column 22 as bracket 115.

Mounted by a bracket 122 (FIG. 1), which is secured to and projects inwardly from the upright 22 at the left hand rear corner of the device 20, is another disc reflector 123, which is positioned slightly above, and in longitudinal registry with the shelf or pallet supporting surface 35 that is located at the left hand side of the device.

In use, the accumulator 20 is adapted to be placed adjacent one end of a storage rack that is serviced by an automatic stacker or load carrier. Whenever the stacker removes an empty pallet from a rack, the stacker moves into registry with the front of the accumulator 20 so its loaded fork mechanism registers approximately with the rectangular area denoted by broken lines at F in FIG. 1. At this time a photoswitch unit on the stacker registers with the disc 123 to sense whether or not a load is already on shelves 35. If shelves 35 are empty the beam of light from the photoswitch on the stacker will be reflected by the disc 123 back to the stacker photoswitch, which will then initiate the conventional "deposit" operation to transfer its unloaded pallet P (broken lines in FIG. 1) onto the accumulator shelves 35. During this operation the stacker fork mechanism advances into the path of beam 107 to prevent reflection thereof back to photoswitch unit 106, thus preventing operation of the lift table 88 until after the forks have been completely withdrawn back onto the stacker.

When the pallet P has been deposited on the shelves 35, it interrupts the beam of light along axis 113 (FIG. 1). Therefore, as soon as the stacker fork mechanism has been retracted far enough once again to enable light from the unit 106 to be directed onto the reflector 108, the pump (not illustrated), which supplies fluid under pressure for the cylinders 66 and 91, is started. This causes fluid under pressure to be delivered to the left end of cylinder 91 (FIG. 4), thus causing rod 93 to be extended far enough to elevate table 88. During this upward movement table 88 engages the underside of the pallet P then resting on the shelves 35, and pushes this pallet upwardly. This movement continues until the table reaches the position denoted at 88' in FIG. 1; and during this upward movement, the pallet will engage the inclined undersurfaces of the plates or escapements 48, causing them to be pivoted outwardly so that angle irons 45 are swung inwardly away from switches S1 and S2 (FIG. 4) releasing these switches. When the pallet has passed above the plates 48 to its broken line position denoted at P' in FIG. 1, the plates pivot back to their normal positions once again to trip switches S1 and S2 (FIG. 1).

When the table is in position 88' (FIG. 1) the dog 95 (FIG. 4) will trip switch S3 to stop the fluid pump, thus stopping upward movement of the table. Then, provided the switches S1 and S2 have returned to their normal, tripped positions (FIG. 4), the above-mentioned solenoid-operated valve is shifted to cause the rod 93 to retract into cylinder 91 to return table 88 to its lowered position.

As the table 88 lowers, the side edges of the pallet engage over the plane shelf-like supporting surfaces 49 of the members 48, and it remains suspended on these supporting two surfaces while the table returns to its lower position. The weight of the pallet may tend to pivot the member 48 inwardly, but the dogs 58 ' and 59' on the outer ends of rods 58 and 59 which overlie the rollers 61, prevent this movement.

When the table 88 reaches its lowermost position it again trips limit switch S4 (FIG. 5). This completes the cycle; and the accumulator now is in condition to receive another empty pallet. When it does, this new pallet is automatically moved upwardly beneath the pallet previously placed on the supports 48, and past the supports; and again as the table descends the pallet, which it has just raised up, is left on the supports, with the previously lifted pallet resting on top of it. Thus, the operation proceeds with each newly lifted pallet carrying the pallet or pallets previously lifted by the table.

In event one of the supports 48 does not return to its normal position (FIG. 1), the table 88 is prevented from returning to its lower position.

As the operation proceeds the pallets will be lifted successively through the portions denoted E, D, C, B, A in FIG. 1, the pallet, which is first lifted up, eventually coming to rest in the position A, with the following successively lifted pallets occupying positions B, C, D, and E. After the uppermost A of the several stacked pallets has reached a position slightly beneath the beam of light 118 (FIG. 1) that is projected from unit 117 to reflector 119, the next elevational operation, when table 88 elevates the next empty pallet upwardly under the stack already in the accumulator, causes the uppermost pallet A in the stacks to be shifted into the path of this light beam, interrupting this beam. When this occurs, unit 117 signals the stacker that the accumulator is loaded, and should be emptied. Also the dog (FIG. 4) trips S3 so table 88 begins to descend again. When the table has descended far enough to release switch S3 (only a slight downward movement) the previously operated unit 117 cause th cylinder 66 (FIG. 1) to be put on supply, thereby causing rod 67 through attached strap 65 to advance rod 58 toward the right in FIG. 1. This pivots lever 55 from its solid line to its broken line position in FIG. 1, so that both rods 58 and 59 are drawn inwardly, causing dogs 58' and 59' at the outer ends of these rods to swing the supports 48 outwardly from beneath the marginal side edges of the stack of pallets positioned thereon. As soon as this occurs, the switches S1 and S2 are released, thereby switching the supply of fluid pressure from the cylinder 66 back to the table elevating cylinder 91. At the same time exhaust valve (not illustrated) for the retracting cylinder 66 remains closed so that the escapements 48 are held in their retracted positions.

The table 88 once again begins to rise slightly until switch S3 is reopened, at which time the cylinder 91 will again be put on exhaust to allow the table 88 to descend to its lowermost position with the stacked pallets thereon. During this downward movement the supports 48 are in their inoperative positions, so that the entire load of pallets come to rest on the shelves 35 in position to be removed by the retractable fork on the stacker. The stacker then removes the pallets from the shelves 35 so that the beam of light from the photoswitch unit 112 once again is allowed to strike the reflector 114, thereby indicating that the shelves 35 are empty. Unit 112 also operates to put cylinder 66 on exhaust so that the supports 48 are allowed to return to their normal positions as shown in FIG. 1. The unloading cycle is now complete, and the accumulator is again ready to receive empty pallets as described above.

From the foregoing it will be apparent that the instant device provides relatively simple and compact means for automatically storing temporarily empty pallets, which otherwise would take up useful space in the storage racks of an automated warehousing system. The pivotal supports or escapements 48 permit empty pallets to be inserted by table 88 successively, one after the other, into the storage area above shelves 35, thus leaving the area between the shelves 35 and supports 48 unobstructed, able to receive unloaded pallets. The several photoswitch units provide automatic controls for coordinating the operation of the stacker and the accumulator, and also provides safety features to prevent accidental damage to the deivce, or to the pallets stored therein.

Having thus described our invention what we claim is:

1. A device for accumulating empty pallets delivered thereto by a load carrier of the type having a retractable fork mechanism for transferring pallets to the device, and for removing stacked pallets from the device, comprising a frame having thereon a pair of spaced, stationary supports registrable with the fork mechanism on said carrier to receive and support horizontally thereon pallets delivered to the device by said fork mechanism, a pair of spaced, movable supports mounted on said frame above said stationary supports, and movable into and out of operative positions in which they engage the lowermost pallet in a stack thereof to support the stack above said stationary supports, a transfer member mounted for vertical movement between said supports, cycling means operative each time an empty pallet is placed on said stationary supports to move said transfer member from a lower position beneath said stationary supports to an upper position above said movable supports, and vice versa, said member being engageable during its upward movements with the pallets on said stationary supports to elevate said pallets into a stack above said movable supports, said movable supports being engageable by the pallets on said transfer member during the upward movements thereof to shift said movable supports to inoperative posiitons, means normally operative after said transfer member has reached said upper position to return said movable supports to their operative positions beneath the stack of pallets on said transfer member to prevent said stack from being lowered onto said stationary supports upon movement of said transfer member back to its lower position, sensing means operable momentarily to interrupt the descent of said transfer member from its upper to its lower position, when the number of stacked pallets thereon reaches a predetermined value, and means operative upon interruption of the descent of said transfer member to retain said movable supports in their inactive positions long enough to allow said transfer member thereafter to return to its lower position with the stacked pallets thereon.

2. A device as defined in claim 1, wherein said sensing means comprises first photoelectric means on said frame above said movable supports for producing a horizontal beam of light disposed to be interrupted by the uppermost pallet in a stack, when the number of pallets in said stack reaches said predetermined value, and means operative, when said light beam is interrupted and the loaded transfer member has descended part way from its upper position, to interrupt said cycling means and momentarily return said transfer member to its upper position.

3. A device as defined in claim 2, including second photoelectric means on said frame adjacent said stationary supports for producing a second horizontal beam of light disposed to be interrupted by a pallet supported on said stationary supports, third photoelectric means on said frame for producing a third horizontal light beam beneath said second beam and disposed to be interrupted by said fork mechanism during transfer of a pallet between said fork mechanism and said stationary supports, and means for actuating said cycling means when said second beam is interrupted by a pallet and said fork mechanism is withdrawn from the path of said third beam.

4. A device as defined in claim 3, including means for releasing said movable support retaining means when a stack of pallets is removed from said stationary supports, and from the path of light from said second beam, by said fork mechanism.

5. A device for accumulating empty pallets, comprising a pair of spaced, stationary supports,
a pair of spaced, movable supports mounted above said stationary supports,
a transfer member reciprocable vertically in the spaces between said supports to elevate pallets one by one on its upward movement from said stationary supports to superposed positions on said movable supports,
resilient means normally holding said movable supports beneath pallets delivered thereto to support said pallets in a stack above said stationary supports,
control means operative, when the number of pallets in said stack reaches a predetermined value, automatically to move said movable supports out of pallet-supporting positions thereby to allow said stack to be lowered onto said transfer member and to cause said transfer member to descend,
said movable supports comprising a pair of spaced members mounted to pivot intermediate their ends about spaced, parallel, horizontal axes into and out of operative positions in which first surfaces on the upper ends thereof are disposed to extend beneath opposite sides of a pallet to engage and support the latter,
means normally holding said movable supports in positions to be engaged by a pallet as the pallet is elevated, so as to be moved thereby out of supporting positions, and for returning said movable supports to supporting positions when the pallet has passed thereby, and
means operative, when the number of pallets in said stack is less then said predetermined value, to prevent said transfer member from returning to its lower limit position when either of said spaced members is in its inoperative position,
a lever mounted intermediate its ends to pivot about a third axis disposed between and parallel to said horizontal axes, and
a pair of rods pivotally connecting opposite ends of said lever to the lower ends of said movable supports,
said control means including means for automatically pivoting said lever in a direction to cause said rods to swing said movable supports temporarily to their inoperative positions each time the number of pallets in said stack reaches said predetermined value.

* * * * *